(12) United States Patent
Wang

(10) Patent No.: US 7,712,298 B1
(45) Date of Patent: May 11, 2010

(54) CHAIN PLATE STRUCTURE

(76) Inventor: Wen-Pin Wang, No. 67, Kang Kou, Kang Nan Tsun, An Ting Hsiang, Tainan Shien (TW)

( * ) Notice: Subject to any disclaimer, the term of this patent is extended or adjusted under 35 U.S.C. 154(b) by 0 days.

(21) Appl. No.: 12/485,447

(22) Filed: Jun. 16, 2009

(51) Int. Cl.
*F16G 13/06* (2006.01)
*F16G 15/06* (2006.01)

(52) U.S. Cl. .................. 59/85; 59/84; 59/5; 474/218; 474/220

(58) Field of Classification Search ............ 474/202, 474/206, 218, 220, 223, 227; 59/4, 5, 84, 59/85
See application file for complete search history.

(56) References Cited

U.S. PATENT DOCUMENTS

| | | | |
|---|---|---|---|
| 628,386 A * | 7/1899 | Berry et al. ............... | 474/220 |
| 4,043,215 A * | 8/1977 | Long et al. ............... | 474/218 |
| D280,288 S * | 8/1985 | Lickton .................... | D8/499 |
| 5,178,585 A * | 1/1993 | Lin et al. ................. | 474/206 |
| 5,186,569 A * | 2/1993 | Wu .......................... | 403/154 |
| 5,291,730 A * | 3/1994 | Wu .......................... | 59/85 |
| 5,299,416 A * | 4/1994 | Wu .......................... | 59/85 |
| 5,305,594 A * | 4/1994 | Wang ....................... | 59/85 |
| 5,362,282 A * | 11/1994 | Lickton ..................... | 474/220 |
| 5,400,585 A * | 3/1995 | Wang ....................... | 59/85 |
| 6,244,032 B1 * | 6/2001 | Christmas et al. ......... | 59/85 |
| 7,543,437 B1 * | 6/2009 | Chin ........................ | 59/85 |
| 2008/0081720 A1 * | 4/2008 | Oishi et al. .............. | 474/227 |

* cited by examiner

Primary Examiner—David B Jones
(74) Attorney, Agent, or Firm—Rosenberg, Klein & Lee

(57) ABSTRACT

A chain plate structure includes a first outer link plate and a second outer link plate, and each of which includes a first/second through hole, a first/second connection hole, a first/second trough and a first/second engaging trough at two sides of the first/second connection hole. A first/second rib extends from an inner periphery of the first/second engaging trough and at least one first/second protrusion extends from the first/second rib. When the first and second outer link plates are connected to each other, the gap between two adjacent inner link plates of a chain is less than 2.3 mm.

6 Claims, 10 Drawing Sheets

F - F

CHAIN PLATE STRUCTURE

FIELD OF THE INVENTION

The present invention relates to a chain plate structure, and more particularly to a chain plate structure having first and second outer link plates, wherein the gap between two adjacent inner link plates of a chain is below 2.3 mm, thereby preventing first and second pins from disengaging from second and first connection holes and keeping the safety to the chain.

BACKGROUND OF THE INVENTION

A conventional bicycle chain is shown in FIGS. 9 and 10, and generally includes multiple connection units "A" each composed of two inner link plates "A1", two first pins "A2" and two second pins "A3" connected between the two inner link plates "A1". The multiple connection units "A" are connected to each other and two outer link plates "B" are connected to two adjacent ends of the two connection units "A" by the second pins "A3" so as to from the bicycle chain. Each of the second pins "A3" has a fixing end "A31" and a connection end "A32" on two respective ends thereof. The connection end "A32" is connected with a neck "A33". The two outer link plates "B" each have a through hole "B1" and an engaging hole "B2", wherein the fixing end "A31" is engaged with the through hole "B1". The engaging hole "B2" includes a first hole "B21" and a second hole "B22", wherein the inner diameter of the first hole "B21" is larger than that of the second hole "B22" and communicates with the second hole "B22". The connection end "A32" is engaged with the first hole "B21". The second hole "B22" is smaller than that of the connection end "A32". The second hole "B22" is wider than that of the neck "A33". A rib "B23" is located within the second hole "B22" and each of the two outer link plates "B" includes two curved sides on opposite sides thereof.

It is noted that there is a gap "F" of 2.36 mm formed between the adjacent inner link plates "A1" so that a gap "D" is formed between the inner link plate "A1" and the adjacent outer link plate "B". The gap "D" makes relative movement between the second pins "A3" and the outer link plates "B". When the derailleur system changes gears, a force will pull the second pins "A3" which moves toward the through hole "B1" and generates noise or even drop from the chain.

The present invention intends to provide a bicycle chain and only a very small gap is formed between the inner link plates so that the chain does not generate noise during changing gears.

SUMMARY OF THE INVENTION

According to a first aspect of the present invention, there is provided a chain plate structure, comprising:

a first outer link plate having a first through hole, a first connection hole, a first trough and a first engaging trough on opposite sides of the first connection hole, the first trough being disposed close to the first through hole and the first engaging trough being disposed away from the first through hole, a first rib extending from an inner periphery of the first engaging trough and at least one first protrusion extending from the first rib, a first pin being fixedly connected in the first through hole, the first pin including a first head at an end thereof and a first neck adjacent to the first head, and a second outer link plate having the same shape with the first outer link plate and having a second through hole, a second connection hole, a second trough and a second engaging trough on opposite sides of the second connection hole, the second trough being disposed close to the second through hole and the second engaging trough being disposed away from the second through hole, a second rib extending from an inner periphery of the second engaging trough and at least one second protrusion extending from the second rib, a second pin being fixedly connected in the second through hole, the second pin including a second head at an end thereof and a second neck adjacent to the second head.

According to a second aspect of the present invention, there is provided a chain plate structure in conjunction with inner link plates at two ends of a chain, comprising:

a first outer link plate having a first through hole, a first connection hole, a first trough and a first engaging trough next to two sides of the first connection hole, the first trough being disposed close to the first through hole and the first engaging trough being disposed away from the first through hole, a first pin being fixedly connected with the first through hole, the first pin including a first head at an end thereof;

a second outer link plate having the same shape with the first outer link plate and having a second through hole, a second connection hole, a second trough and a second engaging trough next to two sides of the second connection hole, the second trough being disposed close to the second through hole and the second engaging trough being disposed away from the second through hole, a second pin being fixedly connected with the second through hole, the second pin including a second head at an end thereof, and the first pin of the first outer link plate and the second pin of the second outer link plate connected to the two inner link plates of the chain, the first head of the first pin of the first outer link plate engaged with the second connection hole of the second outer link plate, the second head of the second pin of the second outer link plate engaged with the first connection hole of the first outer link plate, a gap between the two inner link plates being less than 2.3 mm.

There are several advantages of the chain plate structure of the present invention, which are disclosed as follows:

1. The gap between the inner link plates and the inner and outer link plates is so small such that the when the bicycle chain is shifted between sprockets or driven by the sprocket, the bicycle chain does not shift laterally.

2. There will be no noise generated between the first and second outer link plates during transmission due to no impact and friction.

3. The gap between two adjacent inner link plates is less than 2.3 mm so that when the bicycle chain is pressed, even if the first and second pins are slightly moved within the second and first engaging recesses, they cannot move to the second and first connection holes, so that the first and second pins do not disengage from the second and first connection holes to keep the safe operation of the bicycle chain.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
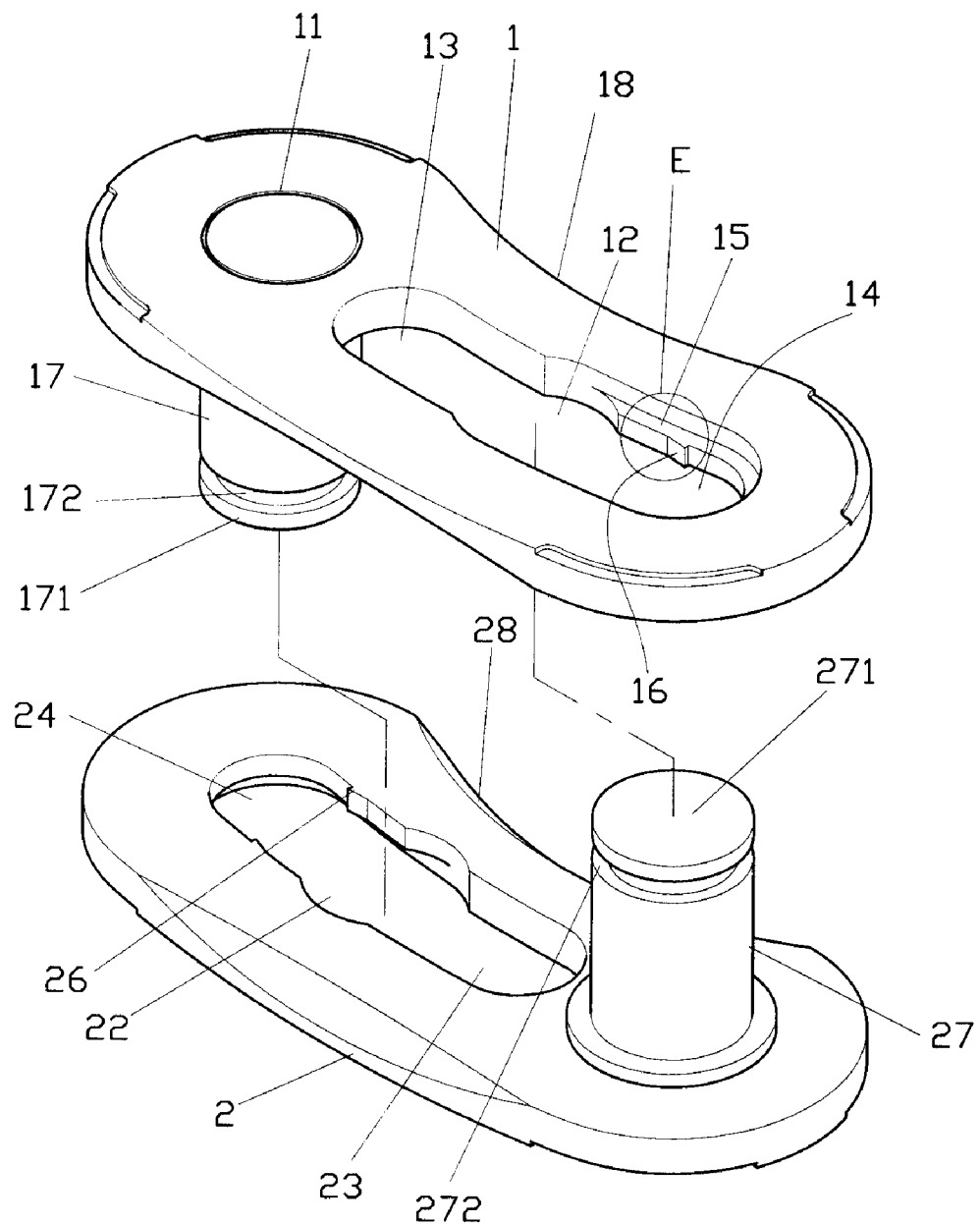
FIG. 1 is an exploded view illustrating the first and second outer link plates according to a first embodiment of the present invention.
Figure 2:
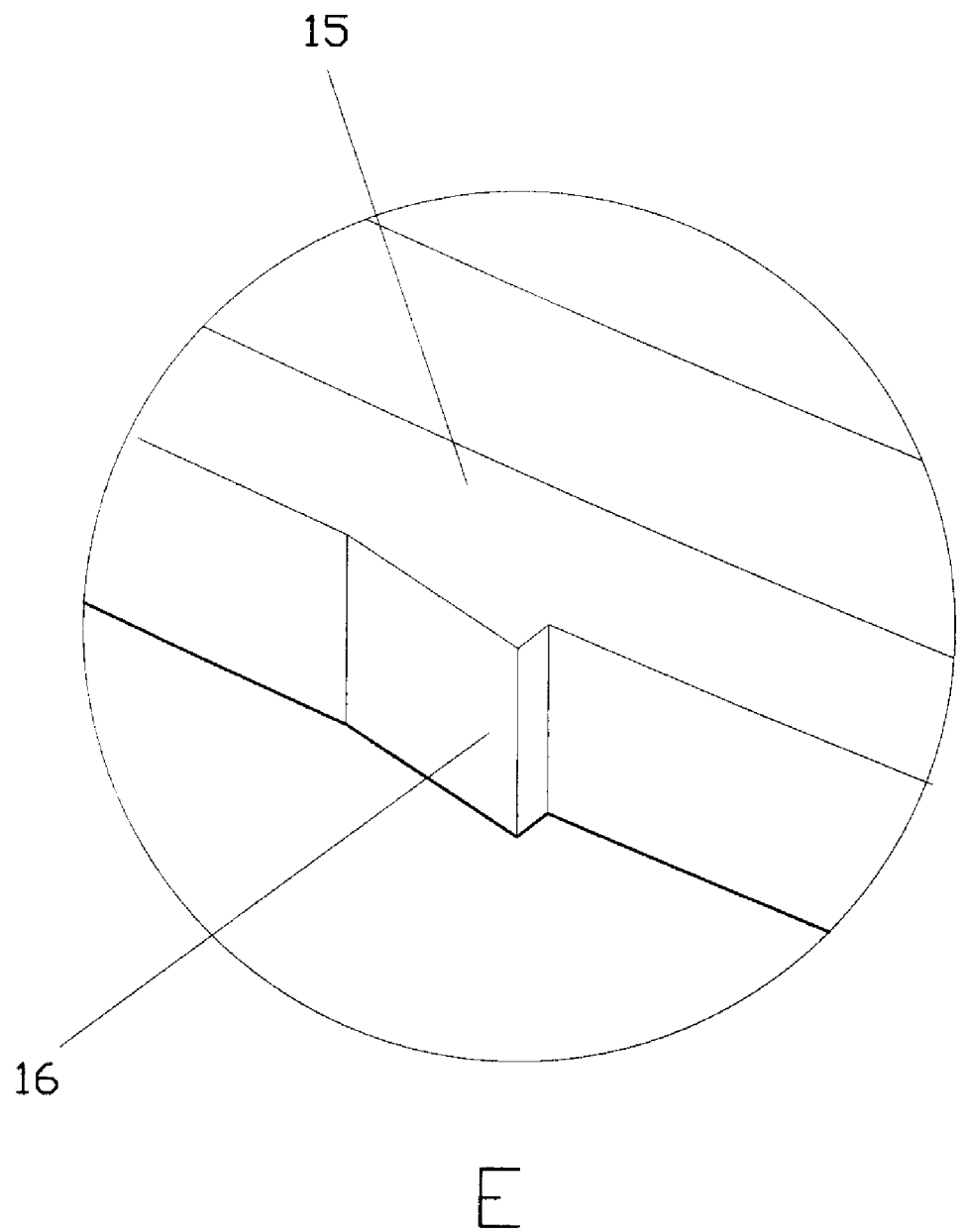
FIG. 2 is an enlarged view of the circle E of FIG. 1 illustrating the protrusion on the rib of the first outer link plate according to the first embodiment of the present invention.

Referring to FIGS. 1 through 6, a chain plate structure according to a first embodiment of the present invention comprises a first outer link plate 1 and a second outer link plate 2 which is connected to the first outer link plate 1. The first outer link plate 1 includes a first through hole 11, a first connection hole 12, a first trough 13 and a first engaging trough 14 on opposite sides of the first connection hole 12. The first trough 13 is disposed close to the first through hole 11 and the first engaging trough 14 is disposed away from the first through hole 11. As shown in FIG. 2, a rib 15 extends from an inner periphery of the first engaging trough 14 and two opposing first protrusions 16 extend outward from the first rib 15 into the first engaging trough 14 of the first outer link plate 1. A first pin 17 is fixedly connected in the first through hole 11, and the first pin 17 includes a first head 171 at an end thereof and a first neck 172 adjacent to the first head 171. The first outer link plate 1 includes a first curved side 18, and the width between the first trough 13 and the first curved side 18 doesn't become smaller so as to keep the strength of the first outer link plate 1.

The second outer link plate 2 has the same shape as the first outer link plate 1, and includes a second through hole 21, a second connection hole 22, a second trough 23 and a second engaging trough 24 on opposite sides of the second connection hole 22. The second trough 23 is disposed close to the second through hole 21 and the second engaging trough 24 is disposed away from the second through hole 21. A second rib 25 extends from an inner periphery of the second engaging trough 24 and two opposing second protrusions 26 extend outward from the second rib 25 into the second engaging trough 24 of the second outer link plate 2. A second pin 27 is fixedly connected in the second through hole 21 and the second pin 27 includes a second head 271 at an end thereof and a second neck 272 adjacent to the second head 271. The second outer link plate 2 includes a second curved side 28.

Figure 3:
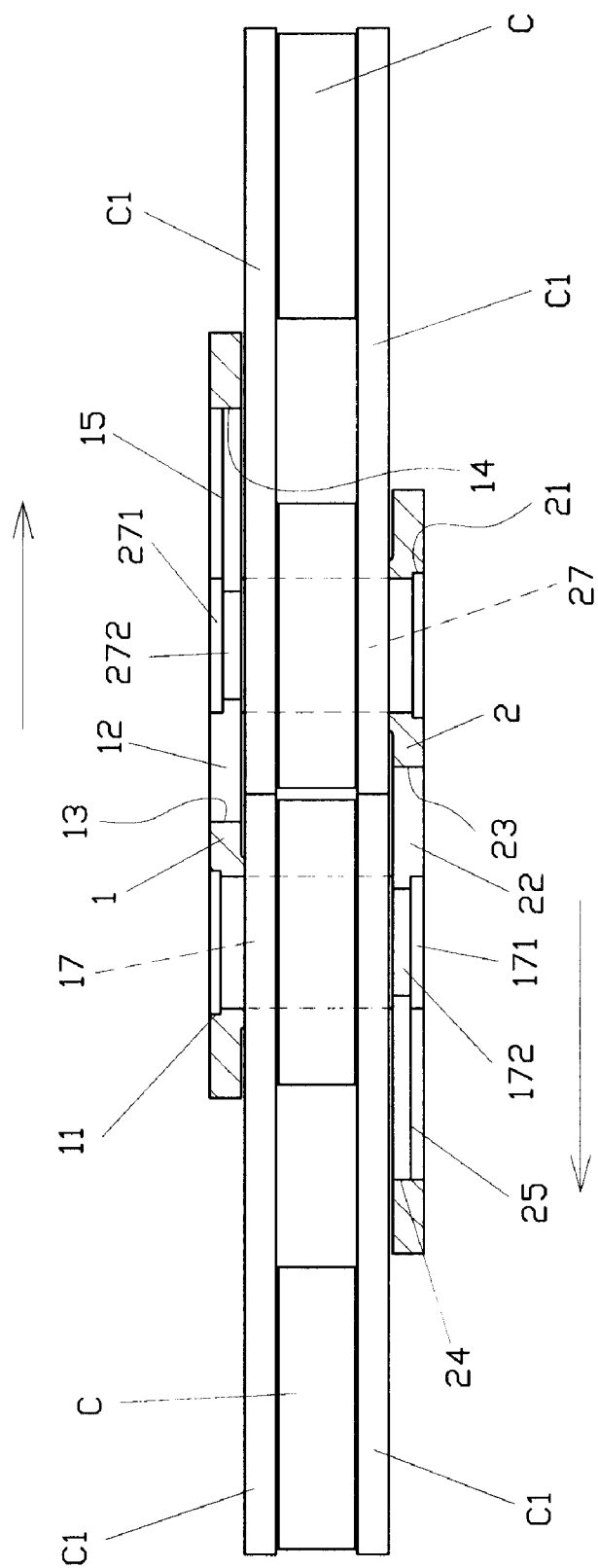
FIG. 3 is a cross sectional view illustrating the first and second outer link plates connected to each other according to the first embodiment of the present invention.

When assembling, the first pin 17 of the first outer link plate 1 and the second pin 27 of the second outer link plate 2 are connected to two respective inner link plates "C1" of a chain "C", respectively. The first head 171 of the first pin 17 of the first outer link plate 1 is engaged with the second connection hole 22 of the second outer link plate 2, and the second head 271 of the second pin 27 of the second outer link plate 2 is engaged with the first connection hole 12 of the first outer link plate 1. There will be no gap between the two adjacent inner link plates "C1" of the chain "C". The first neck 172 of the first pin 17 on the first outer link plate 1 is slid along the second rib 25 of the second outer link plate 2 and the first pin 17 is shifted in the second engaging trough 24 as shown in FIG. 3.

The second neck 272 of the second pin 27 on the second outer link plate 2 is slid along the first rib 15 of the first outer link plate 1 and the second pin 27 is shifted in the first engaging trough 14. The second neck 272 is then pushed over the first protrusions 16 so that the first trough 13 and the first engaging trough 14 are slightly widened and the second neck 272 can move over the first protrusions 16.

Figure 4:
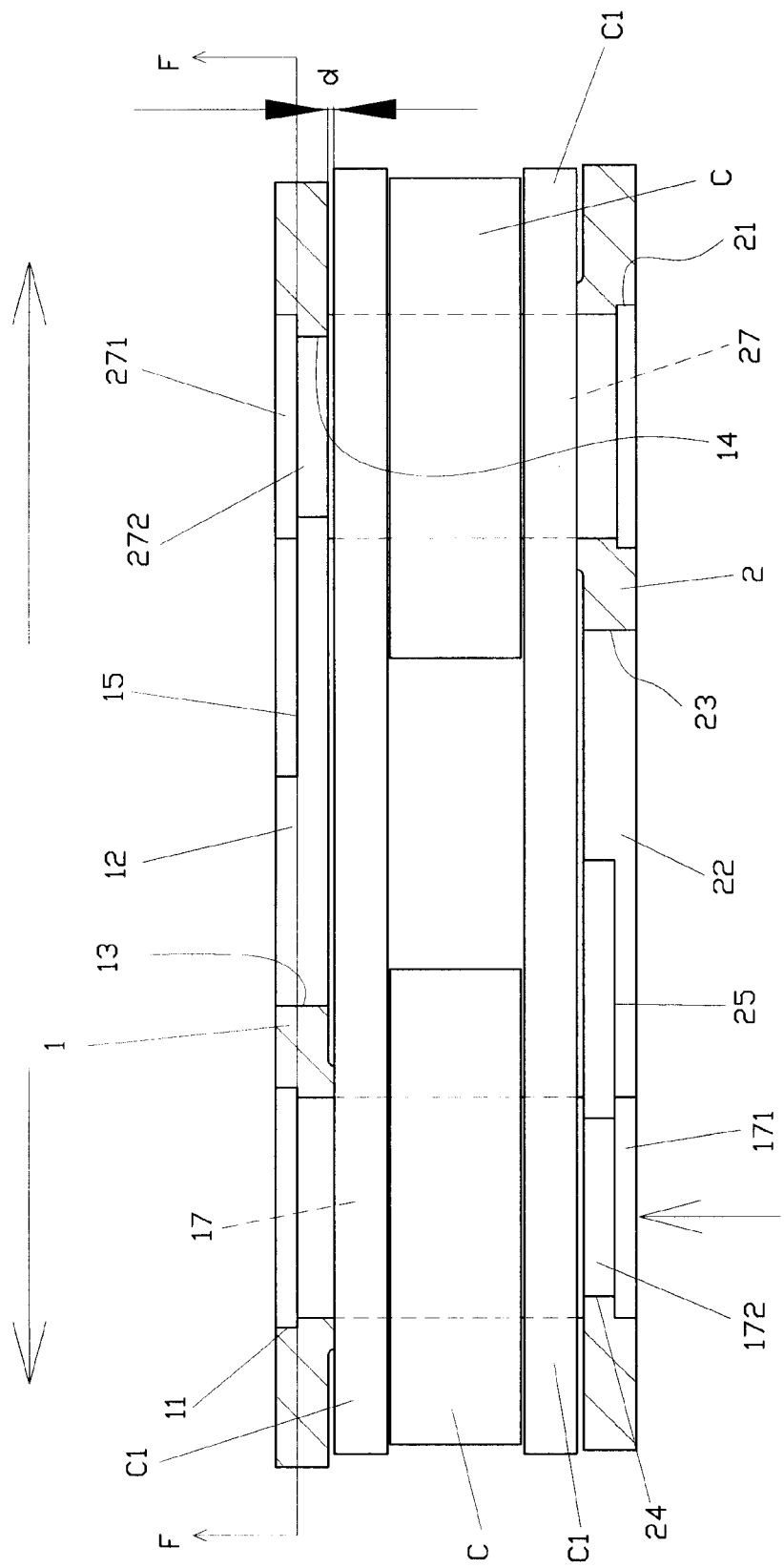
FIG. 4 is a cross sectional view illustrating the first and second outer link plates shifted in two opposite directions according to the first embodiment of the present invention.

The first neck 172 of the first pin 17 on the first outer link plate 1 is slid along the second rib 25 of the second outer link plate 2 and the first pin 17 is shifted in the second engaging trough 24. The first neck 172 is then pushed over the second protrusions 26 so that the second trough 23 and the second engaging trough 24 are slightly widened and the first neck 172 can move over the second protrusions 26 as shown in FIG. 4.

Figure 5:
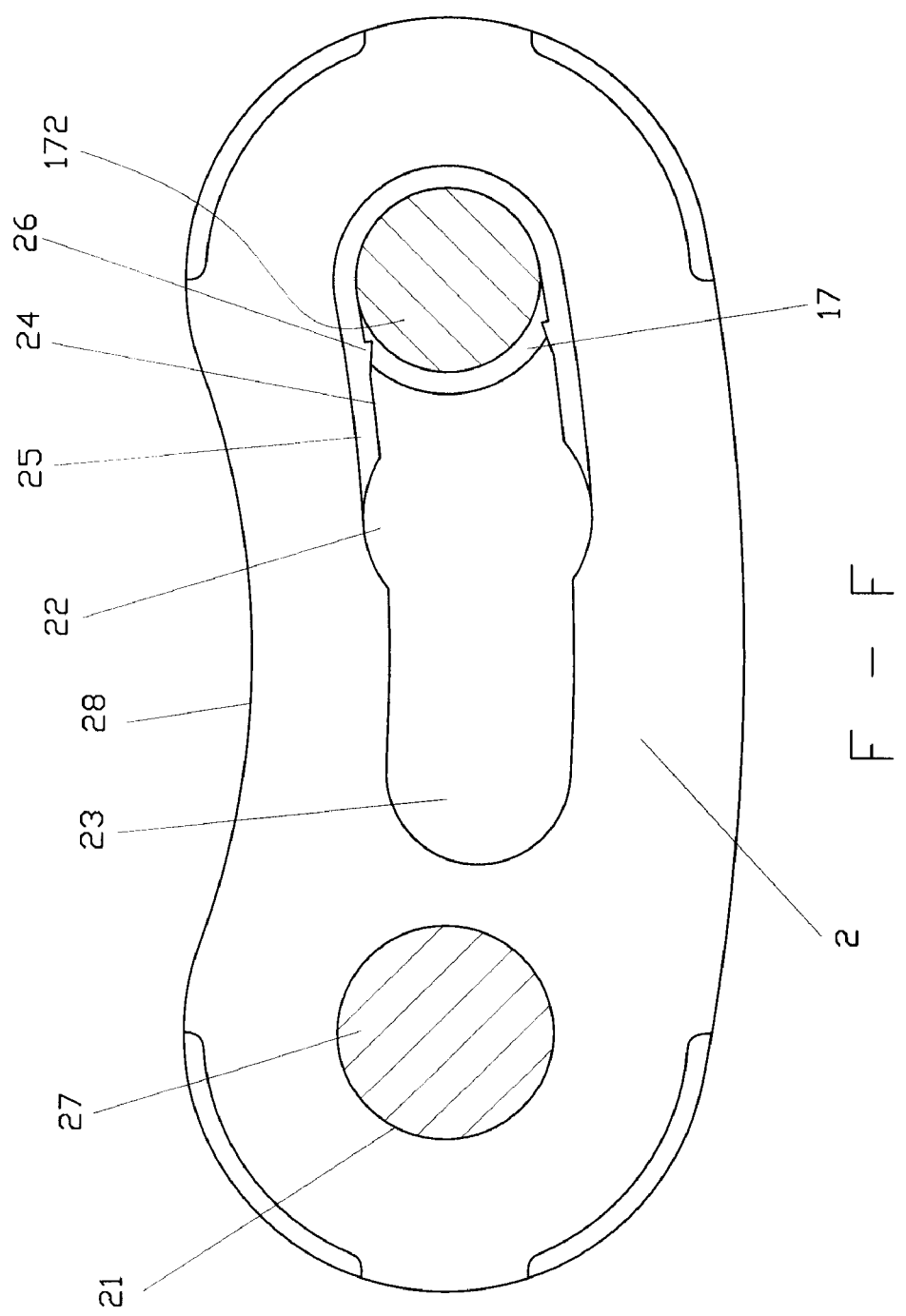
FIG. 5 is a cross sectional view taken along line F-F in FIG. 4.
Figure 6:
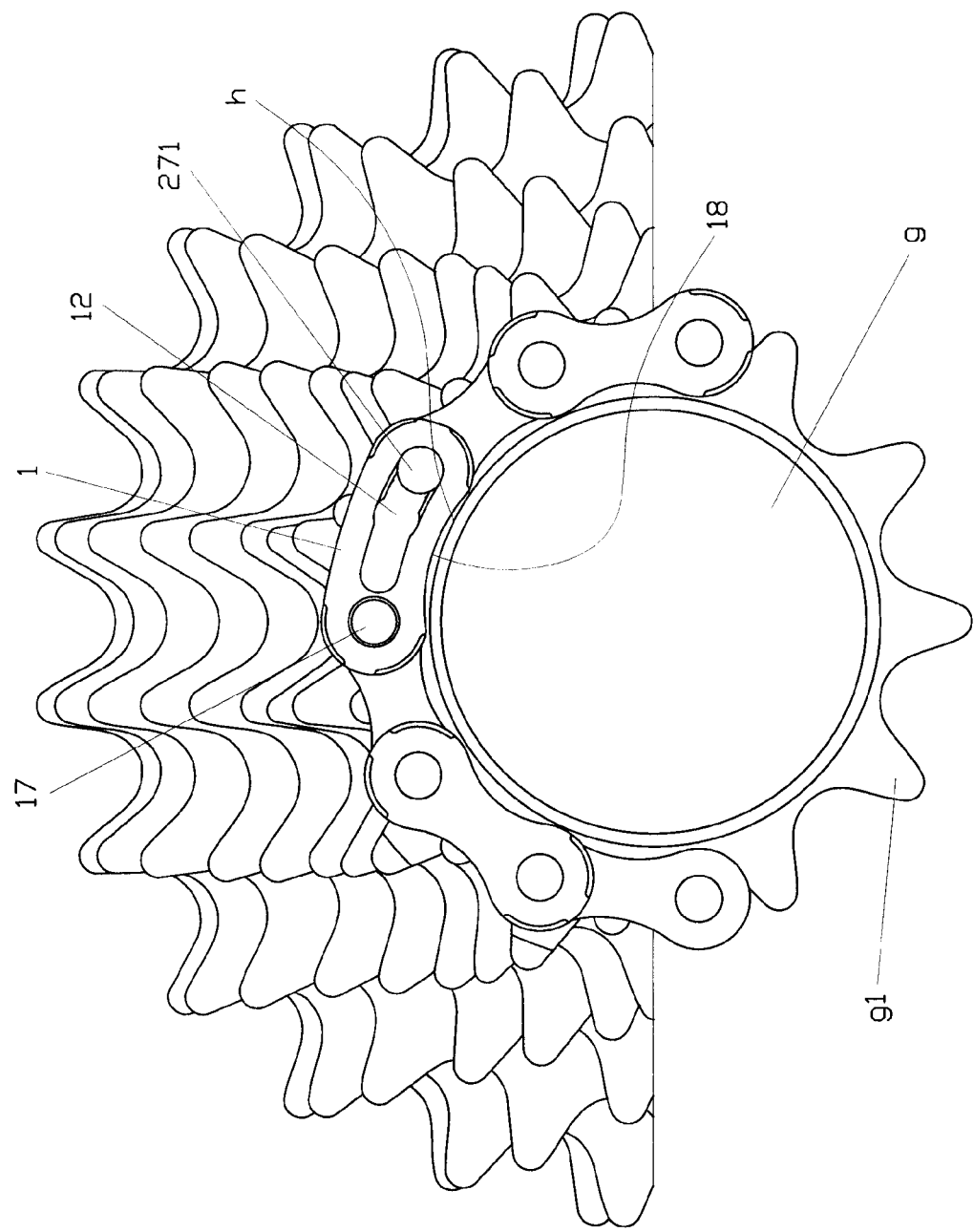
FIG. 6 is a schematic view illustrating the chain engaged with the sprockets of a derailleur system according to the first embodiment of the present invention.

The first and second protrusions 16, 26 are bounced back to their original shape and restrict the first and second necks 172, 272 as shown in FIG. 5. The distal end surfaces of the first and second pins 17, 27 are in flush with the second outer link plate 2 and the first outer link plate 1. The first and second pins 17, 27 are secured with the second outer link plate 2 and the first outer link plate 1. Because the first and second necks 172, 272 are moved in parallel to the second and first outer link plates 2, 1 so that there will be only a small gap "d" (as shown in FIG. 4) formed between the first and second outer link plates 1, 2 and the adjacent inner link plates "C1" of the chain "C", respectively. The first and second curved sides 18, 28 of the first and second outer link plates 1, 2 are engaged with the base edge of sprockets "g1" of a gear set "g" as shown in FIG. 6 and do not shift, thereby reducing noise and friction between the sprockets "g1" and the first and second outer link plates 1, 2. Furthermore, because the first and second pins 17, 27 do not extend out from the second and first outer link plates 2, 1, no impact happened between the base edge "h" and the sprockets "g1".

Figure 7:
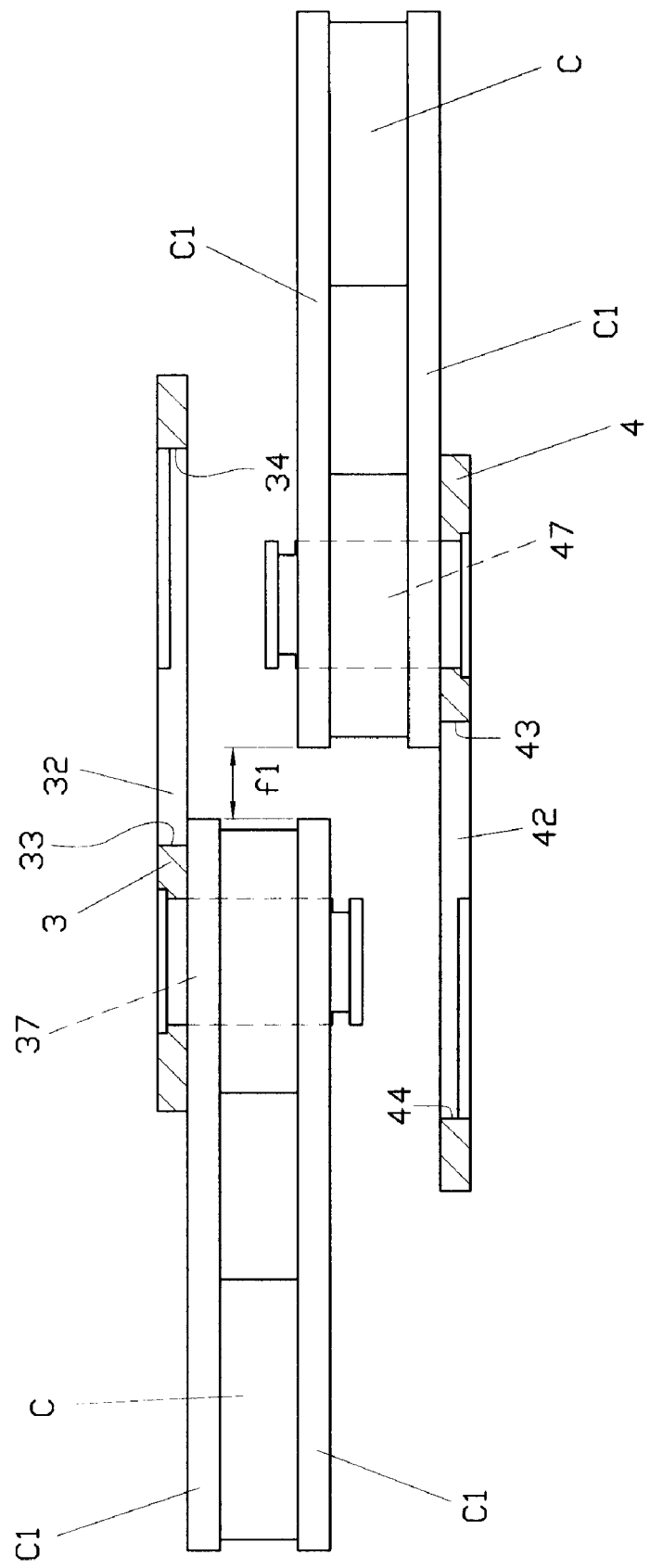
FIG. 7 is a cross sectional view illustrating the first and second outer link plates according to a second embodiment of the present invention.

FIG. 7 shows a second embodiment, wherein the first and second connection holes 32, 42 of the first and second outer link plates 3, 4 are disposed close to the first and second engaging troughes 34, 44 and away from the first and second trough 33, 43 such that when assembling, the gap "f1" between two adjacent inner link plates "C1" is only 2.3 mm. When the chain "C" is pressed, the first and second pins 37, 47 are not disengaged from the second and first outer link plates 4, 3.

Figure 8:
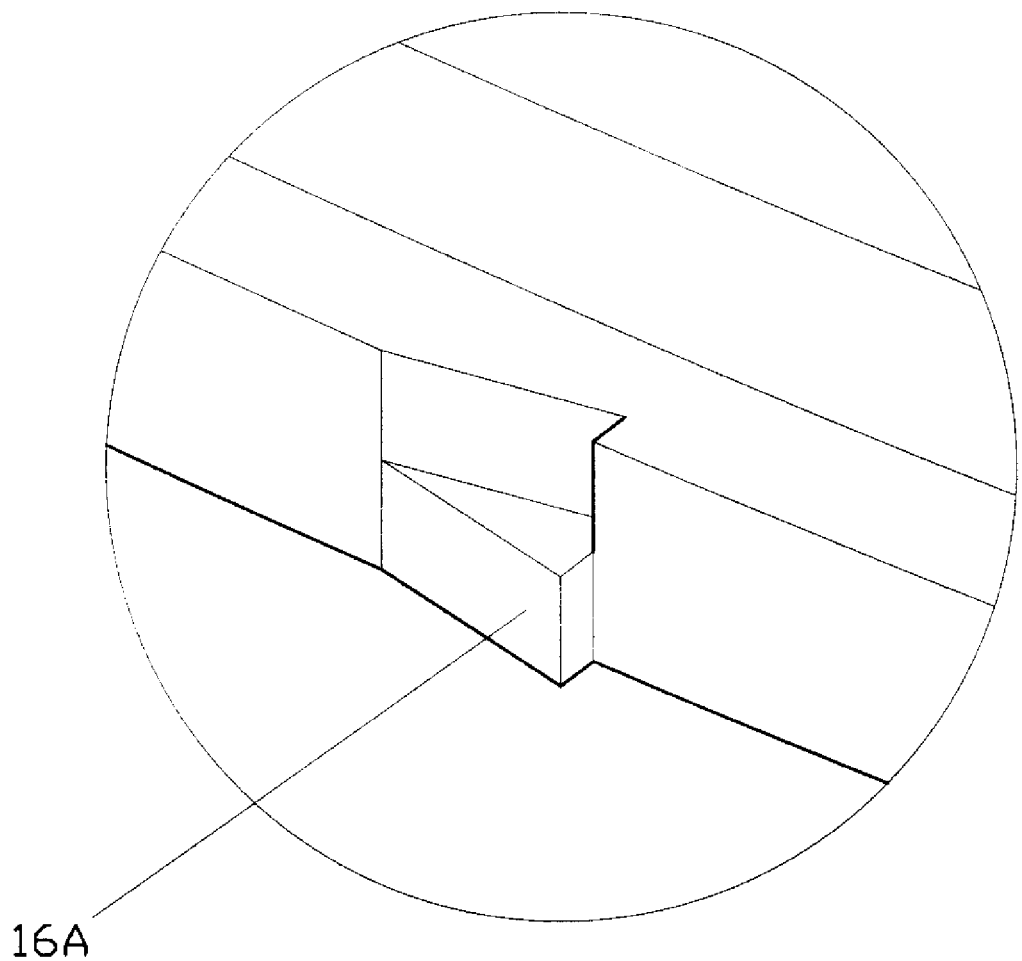
FIG. 8 is an enlarged view illustrating the protrusion on the rib of the first outer link plate according to a third embodiment of the present invention.
Figure 9:
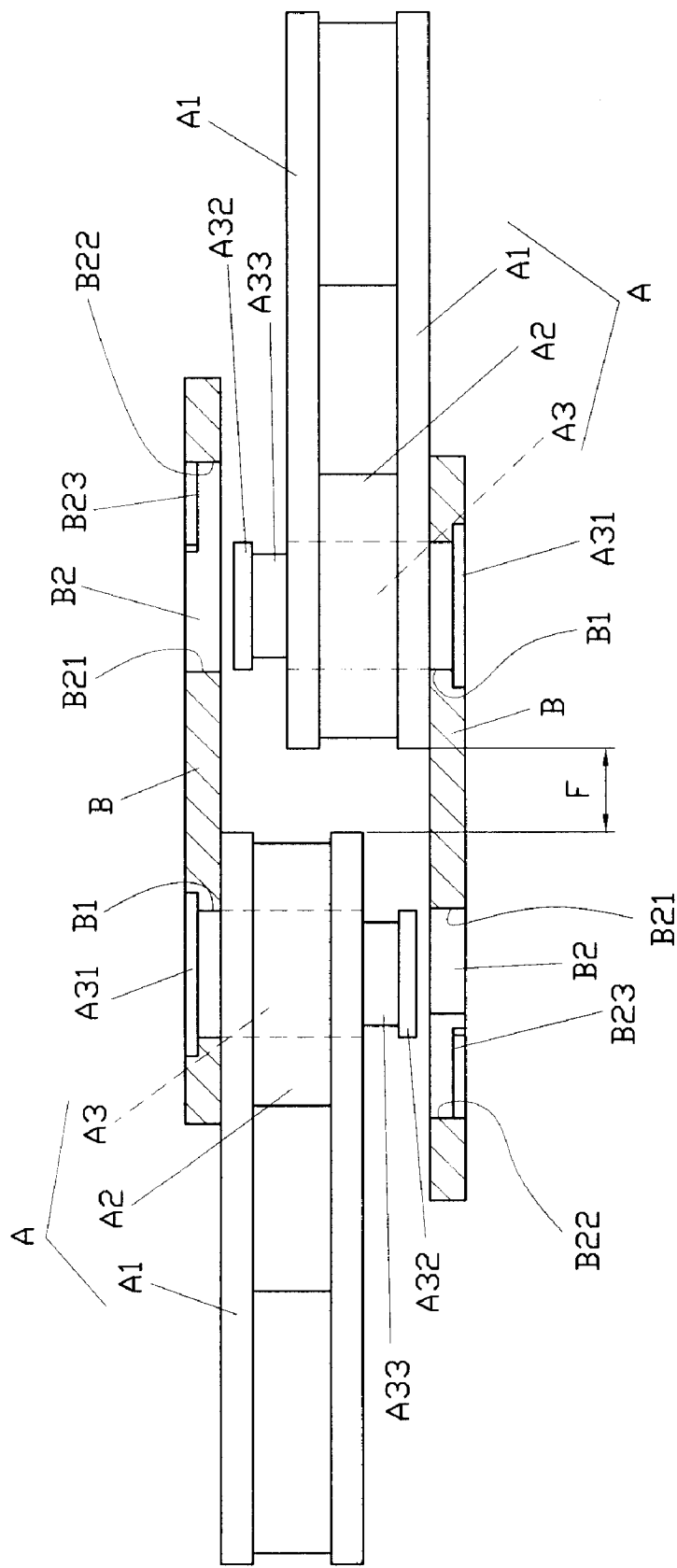
FIG. 9 a cross sectional view of a conventional bicycle chain.
Figure 10:
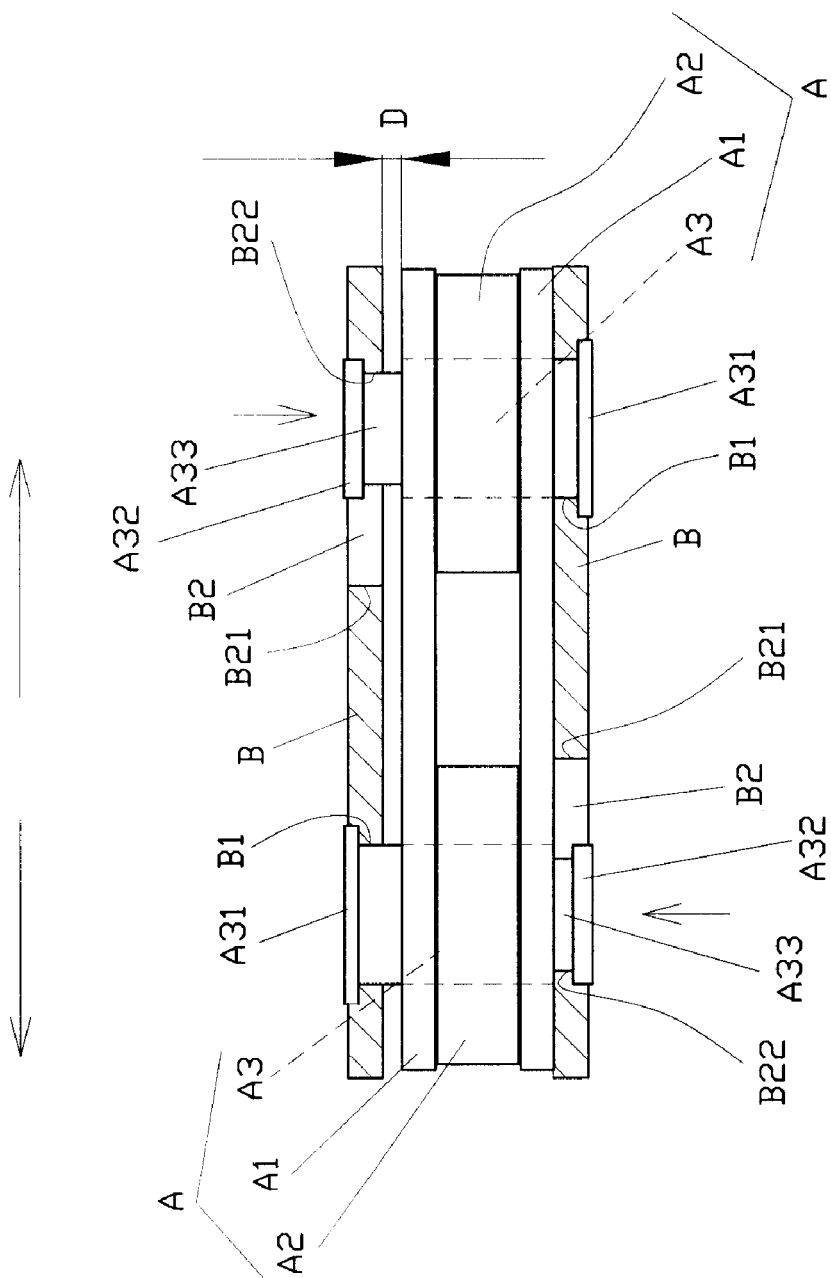
FIG. 10 a cross sectional view illustrating the two outer link plates of the conventional bicycle chain shifted in two directions.

FIG. 8 discloses a third embodiment, wherein the two first protrusions 16A extends downward from a mediate portion of the inner periphery of the first engaging trough 14 to the underside of the first outer link plate 1. The two second protrusions have the same construction as the first protrusions.

While we have shown and described the embodiment in accordance with the present invention, it should be clear to those skilled in the art that further embodiments may be made without departing from the scope of the present invention.

What is claimed is:

1. A chain plate structure, comprising:

a first outer link plate having a first through hole, a first connection hole, a first trough and a first engaging trough on opposite sides of the first connection hole, the first trough being disposed close to the first through hole and the first engaging trough being disposed away from the first through hole, a first rib extending from an inner periphery of the first engaging trough and at least one first protrusion extending from the first rib, a first pin being fixedly connected in the first through hole, the first pin including a first head at an end thereof and a first neck adjacent to the first head, and a second outer link plate having the same shape as the first outer link plate and having a second through hole, a second connection hole, a second trough and a second engaging trough on opposite sides of the second connection hole, the second trough being disposed close to the second through hole and the second engaging trough being disposed away from the second through hole, a second rib extending from an inner periphery of the second engaging trough and at least one second protrusion extending from the second rib, a second pin being fixedly connected in the second through hole, the second pin including a second head at an end thereof and a second neck adjacent to the second head.

2. The chain plate structure as claimed in claim 1, wherein the first protrusion extends outward from the first rib into the first engaging trough and the second protrusion extends outward from the second rib into the second engaging trough.

3. The chain plate structure as claimed in claim 1, wherein the first protrusion extends from an intermediate portion of the inner periphery of the first engaging trough of the first outer link plate, and the second protrusion extends from an intermediate portion of the inner periphery of the second engaging trough of the second outer link plate.

4. The chain plate structure as claimed in claim 1, wherein the first outer link plate includes a first curved side and the second outer link plate includes a second curved side.

5. A chain plate structure in conjunction with inner link plates at two ends of a chain, comprising:

a first outer link plate having a first through hole, a first connection hole, a first trough and a first engaging trough on opposite sides of the first connection hole, the first trough being disposed close to the first through hole and the first engaging trough being disposed away from the first through hole, a first pin being fixedly connected in the first through hole, the first pin including a first head at an end thereof;

a second outer link plate having the same shape as the first outer link plate and having a second through hole, a second connection hole, a second trough and a second engaging trough on opposite sides of the second connection hole, the second trough being disposed close to the second through hole and the second engaging trough being disposed away from the second through hole, a second pin being fixedly connected in the second through hole, the second pin including a second head at an end thereof, and the first pin of the first outer link plate and the second pin of the second outer link plate connected to the two inner link plates of the chain, the first head of the first pin of the first outer link plate engaged with the second connection hole of the second outer link plate, the second head of the second pin of the second outer link plate engaged with the first connection hole of the first outer link plate, a gap between the two inner link plates being less than 2.3 mm.

6. The chain plate structure as claimed in claim 5, wherein the first outer link plate includes a first curved side and the second outer link plate includes a second curved side.

* * * * *